United States Patent
Lewis et al.

(10) Patent No.: US 8,651,186 B2
(45) Date of Patent: *Feb. 18, 2014

(54) RADIATION-INDUCED TRIGGERING FOR SET-ON-COMMAND SEALANT COMPOSITIONS AND METHODS OF USE

(75) Inventors: Samuel J. Lewis, Duncan, OK (US); James L. Davis, Duncan, OK (US); Vijay Gupta, Morrisville, NC (US); Michele Ostraat, Durham, NC (US); David F. Myers, Cary, NC (US); Michael Lamvik, Durham, NC (US); Andrew K. Dummer, Chapel Hill, NC (US); Vikram Rao, Chapel Hill, NC (US); Lawrence R. Roberts, Action, MA (US); Anthony Badalamenti, Katy, TX (US); Paul Hoertz, Morrisville, NC (US)

(73) Assignee: Halliburton Energy Services, Inc., Houston, TX (US)

(*) Notice: Subject to any disclaimer, the term of this patent is extended or adjusted under 35 U.S.C. 154(b) by 417 days.

This patent is subject to a terminal disclaimer.

(21) Appl. No.: 13/039,288

(22) Filed: Mar. 2, 2011

(65) Prior Publication Data

US 2011/0272141 A1    Nov. 10, 2011

Related U.S. Application Data

(63) Continuation-in-part of application No. 12/547,443, filed on Aug. 25, 2009, now Pat. No. 8,245,783, and a continuation-in-part of application No. 12/547,447, filed on Aug. 25, 2009, now Pat. No. 8,143,198.

(51) Int. Cl.
*E21B 33/14* (2006.01)
*E21B 33/138* (2006.01)

(52) U.S. Cl.
USPC .......... 166/294; 166/247; 166/293; 166/295; 166/300

(58) Field of Classification Search
None
See application file for complete search history.

(56) References Cited

U.S. PATENT DOCUMENTS

| | | | |
|---|---|---|---|
| 2,771,620 A | | 11/1956 | Hoffman |
| 3,114,419 A | * | 12/1963 | Perry et al. .................. 166/247 |
| 3,877,522 A | | 4/1975 | Knight et al. |
| 4,036,301 A | | 7/1977 | Powers et al. |
| 4,547,298 A | | 10/1985 | Novak |
| 4,768,593 A | * | 9/1988 | Novak ......................... 166/295 |

(Continued)

FOREIGN PATENT DOCUMENTS

| | | |
|---|---|---|
| JP | 2008111677 A | 5/2008 |
| WO | 2009079231 A2 | 6/2009 |

OTHER PUBLICATIONS

O'Donnell, James H., "Chemistry of Radiation Degradation of Polymers," American Chemical Society, 24, pp. 402-413, 1991.

(Continued)

*Primary Examiner* — George Suchfield
(74) *Attorney, Agent, or Firm* — Craig W. Roddy; McDermott Will & Emery LLP (57) ABSTRACT

The present invention relates to methods useful for isolating a portion of a wellbore. In one embodiment, a method includes preparing a sealant composition containing a set modifier component. The sealant composition is placed into the wellbore and is subjected to ionizing radiation that alters the set modifier component, triggering the thickening of the sealant composition.

21 Claims, 4 Drawing Sheets

(56) References Cited

U.S. PATENT DOCUMENTS

| | | | |
|---|---|---|---|
| 5,697,441 A * | 12/1997 | Vercaemer et al. | 166/285 |
| 8,138,128 B2 | 3/2012 | Lewis et al. | |
| 8,143,198 B2 | 3/2012 | Lewis et al. | |
| 8,162,057 B2 * | 4/2012 | Lewis et al. | 166/293 |
| 8,245,783 B2 * | 8/2012 | Lewis et al. | 166/293 |
| 8,459,355 B2 * | 6/2013 | Lewis et al. | 166/294 |
| 2008/0156231 A1 * | 7/2008 | Boulard et al. | 106/640 |
| 2009/0090514 A1 | 4/2009 | Bailey et al. | |
| 2011/0265996 A1 | 11/2011 | Lewis et al. | |
| 2011/0272141 A1 | 11/2011 | Lewis et al. | |
| 2011/0272142 A1 | 11/2011 | Lewis et al. | |

OTHER PUBLICATIONS

International Search Report & Written Opinion for PCT/GB2012/000214 dated May 31, 2012.

Official Action for Canadian Patent Application No. 2,771,623 dated Mar. 20, 2013.

* cited by examiner

RADIATION-INDUCED TRIGGERING FOR SET-ON-COMMAND SEALANT COMPOSITIONS AND METHODS OF USE

CROSS-REFERENCE TO RELATED PATENTS

The present application is a Continuation-In-Part to U.S. patent application Ser. No. 12/547,443 and to U.S. patent application Ser. No. 12/547,447, each filed on Aug. 25, 2009.

FIELD OF THE INVENTION

The present invention generally relates to hydrocarbon exploration and production operations, such as subterranean cementing operations, and more particularly to compositions and methods that allow for greater control over the setting of fluids or slurries used during such operations.

BACKGROUND OF THE INVENTION

Natural resources such as oil and gas located in a subterranean formation can be recovered by drilling a wellbore down to the subterranean formation, typically while circulating a drilling fluid in the wellbore. After the wellbore is drilled, a string of pipe, e.g., casing, can be run in the wellbore. The drilling fluid is then usually circulated downwardly through the interior of the pipe and upwardly through the annulus between the exterior of the pipe and the walls of the wellbore, although other methodologies are known in the art.

Hydraulic cement compositions are commonly employed in the drilling, completion and repair of oil and gas wells. For example, hydraulic cement compositions are utilized in primary cementing operations whereby strings of pipe such as casing or liners are cemented into wellbores. In performing primary cementing, a hydraulic cement composition is pumped into the annular space between the walls of a wellbore and the exterior surfaces of a pipe string disposed therein. The cement composition is allowed to set in the annular space, thus forming an annular sheath of hardened substantially impermeable cement. This cement sheath physically supports and positions the pipe string relative to the walls of the wellbore and bonds the exterior surfaces of the pipe string to the walls of the wellbore. The cement sheath prevents the unwanted migration of fluids between zones or formations penetrated by the wellbore. Hydraulic cement compositions are also commonly used to plug lost circulation and other undesirable fluid inflow and outflow zones in wells, to plug cracks and holes in pipe strings cemented therein and to accomplish other required remedial well operations. After the cement is placed within the wellbore a period of time is needed for the cement to cure and obtain enough mechanical strength for drilling operations to resume. This down time is often referred to as "waiting-on-cement", or WOC. If operations are resumed prior to the cement obtaining sufficient mechanical strength, the structural integrity of the cement can be compromised.

Two common pumping methods have been used to place the cement composition in the annulus. The cement composition may be pumped down the inner diameter of the casing and up through the annulus to its desired location. This is referred to as a conventional-circulation direction method. Alternately, the cement composition may be pumped directly down the annulus so as to displace well fluids present in the annulus by pushing them up into the inner diameter of the casing. This is referred to as a reverse-circulation direction method. Cement can also be used within the wellbore in other ways, such as by placing cement within the wellbore at a desired location and lowering a casing string into the cement. The latter method may be used, for example, when there is not the ability to circulate well fluids due to fluid loss into a formation penetrated by the wellbore.

In carrying out primary cementing as well as remedial cementing operations in wellbores, the cement compositions are often subjected to high temperatures, particularly when the cementing is carried out in deep subterranean zones. These high temperatures can shorten the thickening times of the cement compositions, meaning the setting of the cement takes place before the cement is adequately pumped into the annular space. Therefore, the use of set retarding additives in the cement compositions has been required. These additives extend the setting times of the compositions so that adequate pumping time is provided in which to place the cement into the desired location.

While a variety of cement set retarding additives have been developed and utilized, known additives, such as sugars or sugar acids, can produce unpredictable results. Hydroxy carboxylic acids, such as tartaric acid, gluconic acid and glucoheptonic acid are commonly used in oil well cementing as a cement retarder. However, if an excess of hydroxy carboxylic acid is used it can over-retard the set of the cement slurry and thereby causing it to remain fluid for an extended period of time. This over-retardation can result in extended waiting time prior to resuming drilling and may allow gas to invade the slurry thereby causing unwanted gas migration. The extended waiting time results in delays in subsequent drilling or completion activities.

In a number of cementing applications, aqueous salt has been utilized as an additive in cement compositions. The salt, generally sodium chloride, functions as a dispersant in cement slurry, causing the slurry to expand upon setting whereby the attainment of a good bond between the wellbore and casing upon setting of the slurry is enhanced. However, salt saturated slurries can cause problems to bordering formations, and in certain situations salt can be leached out of the cement slurry, which could cause cement failure. Also, certain salts, such as calcium salts, can act as accelerating agents, which reduce the setting time of the cement composition in an attempt to overcome the negative effects of set retarders. However, the presence of a set and strength accelerating agent, such as calcium salt, in the cement composition can increase the risk that the cement composition may thicken or set before placement. Given the complexity of the cement chemistry and the large temperature and pressure gradients present in the wellbore, and the difficulty in predicting the exact downhole temperatures during the placement and setting of the cement, it can be difficult to control the retarding additive and accelerating agent to get the desired setting behavior. Systems generally are over-engineered to have very long setting (or thickening) times in order to ensure that the mix remains fluid until all of the cementitious material is in place which can result in excessive WOC.

Therefore, there is a need for improved set control methods, which bring about predictable cement composition setting times in the subterranean environments encountered in wells. In particular, it is desirable to develop methods for rapidly setting cement-based systems whereby the timing of the setting is under the control of technicians in the field without the risk of premature setting. Thus, a need exists for a method of cementing a wellbore that would simultaneously contain sufficient retarder material to ensure proper pumpability for the desired pumping duration and a sufficient concentration of an accelerator to shorten the setting time, whereby the thickening effect of the accelerator is under the control of technicians in the field.

SUMMARY OF THE INVENTION

The present invention generally relates to wellbore fluid and/or slurry compositions that allow for greater control over the setting of such compositions in a wellbore.

Disclosed herein is a method of isolating a portion of a wellbore by preparing a sealant composition comprising a set modifier component. The sealant composition is placed into a wellbore and subjected to ionizing radiation to alter the set modifier. The altered set modifier acts to increase the mechanical strength of the sealant composition.

The sealant composition can have one or more components selected from the group consisting of sealants, resins, cements, settable drilling muds, conformance fluids, and combinations thereof. The set modifier can include one or more components selected from an accelerator, an oxidizing agent, a set retarder or combinations thereof and can include a polymeric component. The ionizing radiation can cause the degradation of the polymeric component. The polymeric component can form an encapsulating layer over particles of the set modifier. The polymeric component can be mixed with the set modifier so the polymeric component acts as a binder and the resulting mixture can then be formed into a pellet. The polymeric component can form an encapsulating layer over the pellet.

The polymeric component can have a radiation tolerance of less than about 500 KiloGrays and can be selected from the group consisting of polyisobutylene, fluoroelastomers, silicon rubber, polyesters, polytetrafluoroethylene, polyacetals, polypropylene, copolymers of polypropylene-ethylene, polymethylpentene, polymethylmethacrylate, fluorinated ethylene propylene, and combinations thereof.

In an embodiment the polymeric component can have a radiation tolerance of less than about 500 KiloGrays and can be selected from the group consisting of: copolymers of methyl-methacrylate (MMA) with a α-substituted chloro or cyano acrylates; MMA based polymers with incorporation of fluorine into the methacrylates; polymers having a C—S bond, such as poly(butene-1-sulfone); polymers having a Photosensitive Acid Generator group (PAG) in the polymer structure; polycarbonates such as poly-bisphenyl-A and bisphenyl-C carbonates; polyamides, such as nylon; water-insoluble cellulose-based polymers, such as Colloidon (nitrocellulose), cellulose acetate and cellulose xanthate; and combinations thereof. Optionally the polymeric component can have a radiation tolerance of less than about 100 KiloGrays, optionally less than about 10 KiloGrays, optionally less than about 1 KiloGrays, optionally less than about 100 Grays, optionally less than about 50 Grays, optionally less than about 10 Grays, optionally less than about 5 Grays.

In an alternate embodiment the sealant composition can contain photocatalytic particles such as $TiO_2$, doped $TiO_2$, or composites that can enhance the degradation of the polymers when exposed to ionizing radiation. The photocatalytic particles can be nanoparticles.

The set modifier can include an accelerator in an amount of from about 0.1% to about 20% by weight of the sealant composition. Subjecting the sealant composition to the ionizing radiation can enable the accelerator to react with compounds within the sealant composition to increase the mechanical strength of the sealant composition.

The set modifier can also include an oxidizing agent in and amount of about 0.05% to about 5% by weight of the sealant composition capable of attacking any set retarder present. Subjecting the sealant composition to the ionizing radiation can enable the release of the oxidizing agent which reduces the retarding capability of the retarder, allowing set.

The set modifier can include a set retarder in an amount from about 0.1% to about 10% by weight of the sealant composition. The set modifier can be a sensitized retarder, and can be a boronated compound. The ionizing radiation can be sufficient to degrade the set retarder, thus reducing the retarding effect.

The method can further include at least one sensitizer material to increase the sealant composition capture efficiency of the ionizing radiation. The sensitizer material can be a boron compound. The sealant composition can further include at least one scintillator material capable of emitting secondary radiation upon exposure to the ionizing radiation. The sensitizer material can also be a scintillator material.

The ionizing radiation can be selected from the group consisting of alpha rays, beta rays, gamma rays, neutron rays, proton rays, UV rays and X-rays. The ionizing radiation can be emitted from a high-flux neutron source that can be selected from the group consisting of plutonium-beryllium, americium-beryllium, and americium-lithium. The high flux neutron source can be an accelerator based neutron generator.

A radiation emitter can be lowered into the wellbore and the ionizing radiation can be emitted from a radiation emitter that is subject to the control of technicians. Two or more radiation emitters can optionally be separately lowered to two or more depths of the wellbore, such that the two or more depths of the wellbore can be subject to ionizing radiation simultaneously.

An alternate embodiment is a method of cementing a wellbore that includes preparing a cement composition including hydraulic cement and sufficient water to form a slurry, adding an accelerator to the slurry, placing the slurry containing the accelerator into a wellbore, and subjecting the slurry to ionizing radiation after the slurry is pumped into the wellbore to activate the accelerator. The accelerator can be a calcium salt. The accelerator can be combined with a polymeric component, such as mixed wherein the polymeric component acts as a binder and the resulting mixture is then formed into a pellet. The ionizing radiation can cause the degradation of the polymeric component and facilitate the release of the accelerator. The accelerator can be added in an amount of from about 0.1% to about 20% by weight of cement. The polymeric component can have an ionizing radiation tolerance of less than about 500 KiloGrays. The ionizing radiation can be emitted from a high-flux neutron source.

An alternate embodiment is a method of cementing a wellbore that includes preparing a cement composition having an accelerating agent, wherein the accelerating agent is encapsulated by a polymer, placing the cement composition into the wellbore and subjecting the placed cement composition to ionizing radiation. The polymer serves to isolate the accelerating agent from the cement composition. The step of introducing the ionizing radiation is sufficient to induce the degradation of the polymer, thus dispersing the encapsulated accelerating agent into the cement composition.

An alternate embodiment is a method of cementing a wellbore that includes preparing a cement composition having an oxidizing agent and a retarder, wherein the oxidizing agent is encapsulated by a polymer but the retarder is not, placing the cement composition into the wellbore and subjecting the placed cement composition to the ionizing radiation. The polymer serves to isolate the oxidizing agent from the cement composition and retarder contained therein. The step of introducing the ionizing radiation is sufficient to induce the degradation of the polymer, thus dispersing the encapsulated oxidizing agent into the cement composition and subsequently degrading the retarder, thus allowing set.

Also disclosed herein is a method of cementing a wellbore that includes preparing a cement composition with a retarder. The cement composition is placed into a wellbore and the placed cement composition is subjected to ionizing radiation resulting from a neutron source. The radiation that is introduced into the cement composition is of sufficient strength to selectively alter or degrade the molecules of the retarder, thus allowing the curing reactions in the cement to proceed. In an embodiment the retarder is a sensitized retarder, such as a boronated retarder.

Additionally disclosed herein is a method of cementing a wellbore that includes preparing a cement composition including an accelerating agent and a retarder, placing the resulting cement composition into a wellbore and subjecting the placed cement composition to ionizing radiation that is of sufficient strength to selectively alter or degrade the molecules of the retarder, thus allowing the accelerating agent to take effect resulting in the rapid curing of the cement mixture. In an optional embodiment, the method includes preparing a cement mixture by first adding a sensitized retarder to a composition including cement and water, followed by adding an accelerating agent to the composition including cement, water and a sensitized retarder. In an alternative embodiment, the accelerating agent is encapsulated by a polymer capsule, which serves to isolate the accelerating agent from the cement composition. The step of introducing the ionizing radiation may be sufficient to induce the degradation of the polymer capsule, thus dispersing the encapsulated accelerating agent into the cement composition.

The preceding has outlined rather broadly the features and technical advantages of the present invention in order that the detailed description of the invention may be more fully understood. The features and technical advantages of the present invention will be readily apparent to those skilled in the art upon a reading of the detailed description of the embodiments of the invention, which follows.

DETAILED DESCRIPTION

The present invention relates to generally to wellbore operations involving fluids or slurries, and more particularly, to fluids or slurries that contain accelerating agents and/or retarders that can be released, activated and/or deactivated on command to provide thickening to the fluid or slurry. The fluids or slurries referred to herein can be any suitable for wellbore operations, drilling, completion, workover or production operations such as cements, drilling muds, lost circulation fluids, fracturing fluids, conformance fluids, sealants, resins, etc. One embodiment of the present invention relates to wellbore cementing operations, and more particularly, to methods of cementing in wellbores using cementitious compositions that contain accelerating agents and/or retarders that can be released and/or deactivated on command.

The cementitious compositions disclosed herein generally include water and a cement component such as hydraulic cement, which can include calcium, aluminum, silicon, oxygen, and/or sulfur that sets and hardens by reaction with the water.

Figure 1:
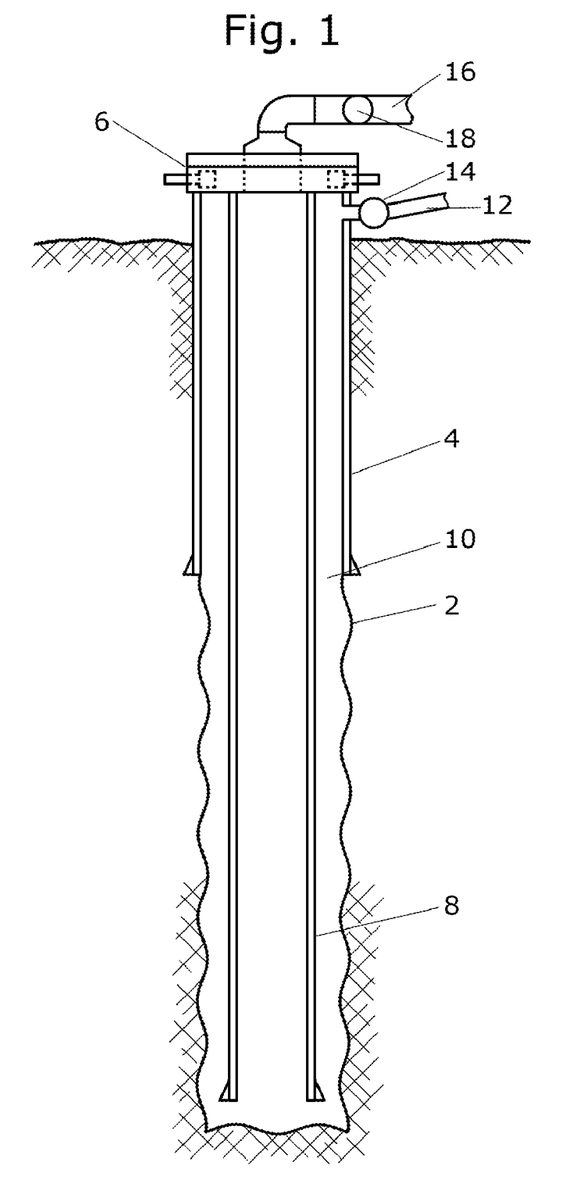
FIG. 1 illustrates a cross sectional side view of a wellbore.

Referring to FIG. 1, a cross sectional side view of an embodiment of a wellbore 2 is illustrated. Surface casing 4, having a wellhead 6 attached, is installed in the wellbore 2. Casing 8 is suspended from the wellhead 6 to the bottom of the wellbore 2. An annulus 10 is defined between casing 8 and the wellbore 2. Annulus flow line 12 fluidly communicates with annulus 10 through the wellhead 6 and/or surfacing casing 4 with an annulus valve 14. Flow line 16 is connected to the wellhead 6 to allow fluid communication with the inner diameter of casing 8 and a casing valve 18. At the lower most end of casing 8 the casing is open to the wellbore 2 or has circulation ports in the walls of casing 8 (not shown) to allow fluid communication between the annulus 10 and the inner diameter of casing 8.

A cement composition can be pumped down the casing 8 and circulated up the annulus 10 while fluid returns are taken from the annulus 10 out flow line 12, in a typical circulation direction. Alternately the cement composition can be pumped into the annulus 10 from annulus flow line 12 while fluid returns are taken from the inner diameter of casing 8 through flow line 16. Thus, fluid flows through wellbore 2 in a reverse circulation direction.

In an alternate method a fluid composition, such as a cement slurry, can be placed within the wellbore 2 and a sealed or filled tubular, such as casing 8, can be lowered into the wellbore 2 such that the fluid composition is displaced into the annulus 10 area, thereby placing the fluid composition within the annulus 10 without pumping the fluid composition into the annulus 10. The above method can be referred to as puddle cementing. The fluid composition can be a drilling fluid placed within the wellbore after drilling operations are complete.

Any cement suitable for use in subterranean applications may be suitable for use in the present invention. In certain embodiments, the cement compositions used in the present invention include hydraulic cement. Examples of hydraulic cements include but are not limited to Portland cements (e.g., Classes A, C, G, and H Portland cements), pozzolana cements, gypsum cements, phosphate cements, high alumina content cements, silica cements, high alkalinity cements, and combinations thereof. Cements including shale, cement kiln dust or blast furnace slag also may be suitable for use in the present invention. In certain embodiments, the shale may include vitrified shale; in certain other embodiments, the shale may include raw shale (e.g., unfired shale), or a mixture of raw shale and vitrified shale.

The cementitious compositions used in the present invention generally include a base fluid. A wide variety of base fluids may be suitable for use with the present invention, including, inter alia, an aqueous-based base fluid, a nonaqueous-based base fluid, and mixtures thereof. Where the base fluid is aqueous-based, it may include water that may be from any source, provided that the water does not contain an excess of compounds (e.g., dissolved organics, such as tannins) that may adversely affect other compounds in the cement compositions. For example, a cement composition useful with the present invention can include fresh water, salt water (e.g., water containing one or more salts dissolved therein), brine (e.g., saturated salt water), or seawater. Where the base fluid is nonaqueous-based, the base fluid may include any number of organic liquids. Examples of suitable organic liquids include, but are not limited to, mineral oils, synthetic oils, esters, and the like. In certain embodiments of the present invention wherein primary cementing is performed, an aqueous-based base-fluid may be used. The base fluid may be present in an amount sufficient to form a pumpable slurry. More particularly, in certain embodiments wherein the base fluid is water, the base fluid may be present in the cement compositions used in the present invention in an amount in the range of from about 25% to about 150% by weight of cement ("bwoc"). In certain embodiments wherein the base fluid is water, the base fluid may be present in the cement compositions in the range of from about 30% to about 75% bwoc. In still other embodiments wherein the base fluid is water, the base fluid may be present in the cement compositions in the range of from about 40% to about 60% bwoc. In still other embodiments wherein the base fluid is water, the base fluid may be present in the cement compositions in the range of from about 35% to about 50% bwoc. The cement composition may include a sufficient amount of water to form a pumpable cementitious slurry. The water may be fresh water or salt water, e.g., an unsaturated aqueous salt solution or a saturated aqueous salt solution such as brine or seawater.

Optionally, the fluid or slurry compositions used in the present invention may include a fluid loss control additive. A variety of fluid loss control additives may be suitable for use with the present invention, including, inter alia, fibers, flakes, particulates, modified guars, latexes, and acrylamide methyl sulfonic acid copolymers such as those that are further described in U.S. Pat. Nos. 4,015,991; 4,515,635; 4,555,269; 4,676,317; 4,703,801; 5,339,903; and 6,268,406, the entire disclosures of which are hereby incorporated herein by reference. Generally, the fluid loss control additive is present in the cement compositions used in the present invention in an amount sufficient to provide a desired degree of fluid loss control. More particularly, the fluid loss control additive may be present in the cement compositions used in the present invention in an amount in the range of from about 0.1% to about 10% bwoc. In certain embodiments, the fluid loss control additive is present in the cement compositions used in the present invention in an amount in the range of from about 0.2% to about 3% bwoc.

Optionally, the compositions used in the present invention also may include a mechanical-property modifier. Examples of suitable mechanical-property modifiers may include, inter alia, gases that are added at the surface (e.g., nitrogen), gas-generating additives that may generate a gas in situ at a desired time (e.g., aluminum powder or azodicarbonamide), hollow microspheres, elastomers (e.g., elastic particles including a styrene/divinylbenzene copolymer), high aspect ratio materials (including, inter alia, fibers), resilient graphitic materials, vapor/fluid-filled beads, matrix-sorbable materials having time-dependent sorption (initiated by, e.g., degradation), mixtures thereof (e.g., mixtures of microspheres and gases), or the like. In certain embodiments of the present invention, the optional mechanical-property modifier may include a latex.

In certain optional embodiments wherein microspheres are added to a fluid or slurry, such as cement compositions useful with the present invention, the microspheres may be present in the cement compositions in an amount in the range of from about 5% to about 75% bwoc. In certain embodiments of the present invention, the inclusion of microspheres in the cement compositions useful with the present invention may reduce the density of the cement composition.

In certain optional embodiments wherein one or more gas-generating additives are used as mechanical property modifiers in the fluid or slurry compositions used in the present invention, the one or more gas-generating additives may include, inter alia, aluminum powder that may generate hydrogen gas in situ, or they may include azodicarbonamide that may generate nitrogen gas in situ. Other gases and/or gas-generating additives also may be suitable for inclusion in the fluid or slurry compositions used in the present invention. Where included, a gas-generating additive may be present in cement compositions in an amount in the range of from about 0.1% to about 5% bwoc. In certain embodiments where the gas-generating additive is aluminum powder, the aluminum powder may be present in the cement compositions in an amount in the range of from about 0.1% to about 1% bwoc. In certain embodiments where the gas-generating additive is an azodicarbonamide, the azodicarbonamide may be present in the cement compositions in an amount in the range of from about 0.5% to about 5% bwoc.

Optionally, the fluid or slurry compositions used in the present invention also may include additional suitable additives, including defoaming agents, dispersants, density-reducing additives, surfactants, weighting materials, viscosifiers, fly ash, silica, free water control agents, and the like. Any suitable additive may be incorporated within the fluid or slurry compositions used in the present invention.

The fluid or slurry compositions used in the present invention can further include a set retarder. Set retarding admixtures lengthen the time at which the fluid or slurry composition remains a fluid. These retarding admixtures consequently allow a fluid or slurry, such as cement, to be pumped along long distances without the effect of premature setting. A broad variety of set retarders may be suitable for use in the fluid or slurry compositions used in the present invention. For example, the set retarder may include, inter alia, phosphonic acid, phosphonic acid derivatives, lignosulfonates, salts, sugars, carbohydrate compounds, organic acids, carboxymethylated hydroxyethylated celluloses, synthetic co- or ter-polymers including sulfonate and carboxylic acid groups, and/or borate compounds. In certain embodiments, the set retarders used in the present invention are phosphonic acid derivatives, such as those described in U.S. Pat. No. 4,676,832, the entire disclosure of which is hereby incorporated herein. Examples of suitable borate compounds include, but are not limited to, sodium tetraborate and potassium pentaborate. Examples of suitable organic acids include, inter alia, gluconic acid and tartaric acid. Generally, the set retarder is present in the fluid or slurry compositions used in the present invention in an amount sufficient to delay the setting of the fluid or slurry composition in a subterranean formation for a desired time. More particularly, the set retarder may be present in the fluid or slurry compositions used in the present invention in an amount in the range of from about 0.1% to about 10% bwoc. In certain embodiments, the set retarder is present in the fluid or slurry compositions used in the present invention in an amount in the range of from about 0.5% to about 4% bwoc.

The set retarders of the current invention may include a sensitizer-containing retarder, such as a boron-containing retarder. The sensitizer can be made from a material having a strong radiation absorption property. The sensitizer can also be a scintillator material. The sensitizer can be any material that increases the capture efficiency of the ionizing radiation within the slurry. This sensitizer-containing retarder, also referred to as a sensitized retarder, can be a boron-containing retarder, also referred to as a boronated retarder, may include a wide variety of set retarders, including the set retarders disclosed herein, wherein the selected set retarder, or combination or set retarders, additionally includes at least one boron atom. As discussed in the immediately preceding paragraph, sugars and/or carbohydrates can be used as a retarder in the setting of a cement composition. In an embodiment, the retarder is a sensitized sugar or carbohydrate. In a more specific embodiment, the sensitized retarder is boronated glucose. In an even more specific embodiment, the boronated glucose is represented by 3-O-(o-Carborany-1-ylmethyl)-D-glucose, as presented in U.S. Pat. No. 5,466,679, to Soloway et al.

Various elements can be utilized as a sensitized material. In general, elements having a greater absorption cross-section than the wellbore treatment fluid composition can be used to increase the capture efficiency of the ionizing radiation within the composition. Many wellbore treatment fluid compositions can comprise calcium, which has an absorption cross-section for 2200 m/s neutrons of about 0.43 barn. A non-limiting listing of elements having an absorption cross-section for 2200 m/s neutrons of 10 barn or greater is shown below in Table 1. A barn is defined as being $10^{-28}$ m$^2$, and corresponds to approximately the cross sectional area of a uranium nucleus.

TABLE 1

Absorption cross section for 2200 m/s neutrons

| Element | Absorption cross section for 2200 m/s neutrons (barn) |
|---|---|
| Li | 71 |
| B | 767 |
| Cl | 34 |
| Sc | 28 |
| Mn | 13 |
| Co | 37 |
| Se | 12 |
| Kr | 25 |
| Tc | 20 |
| Rh | 145 |
| Ag | 63 |
| Cd | 2,520 |
| In | 194 |
| Xe | 24 |
| Pr | 12 |
| Nd | 51 |
| Pm | 168 |
| Sm | 5,922 |
| Eu | 4,530 |
| Gd | 49,700 |
| Tb | 23 |
| Dy | 994 |
| Ho | 65 |
| Er | 159 |
| Tm | 100 |
| Yb | 35 |
| Lu | 74 |
| Hf | 104 |
| Ta | 21 |
| W | 18 |
| Re | 90 |
| Os | 16 |
| Ir | 425 |
| Pt | 10 |
| Au | 99 |
| Hg | 372 |

The compositions of the present invention may also include an accelerator. The accelerator aids in overcoming possible delays caused by the set retarders by shortening the setting time of the fluid or slurry composition. A broad variety of accelerators may be suitable for use in the fluid or slurry compositions used in the present invention, the accelerator may include any component that reduces the setting time of a cement composition. For example, the accelerator may include alkali and alkali earth metal salts, silicate salts, aluminates and amines, such as triethanolamine. In an embodiment, the accelerator is a calcium salt. The calcium salt may be selected from the group consisting of calcium formate, calcium nitrate, calcium nitrite and calcium chloride. In a specific embodiment, the accelerator is calcium chloride. The accelerator may be present in the fluid or slurry compositions used in the present invention in an amount in the range of from about 0.1% to about 20% bwoc. In certain embodiments, the accelerator is present in the cement compositions used in the present invention in an amount in the range of from about 4% to about 12% bwoc.

The accelerators of the current invention may be combined with a polymeric component. In an embodiment the accelerator is encapsulated by the polymeric component. In another aspect, the accelerator is uniformly mixed with the polymeric, which acts as a binder, the resulting mixture is then pressed into a pellet. In yet another aspect, the resulting pellet is ultimately encapsulated by a polymeric component. The polymeric component used as a binder in forming the pellet may be of a different composition from the polymeric component used in encapsulating the pellet. Further, it may be of a composition sensitive to alkaline hydrolysis, such that the alkaline environment of the cement system contributes to its more rapid degradation. The encapsulating polymer layer can be applied using a polymer coating method selected from the group consisting of dip coating, spray coating, extrusion coating, transfer printing and any combination thereof. The encapsulating polymer layer may also be applied using any common polymer coating method.

The oxidizing agents of the current invention may be combined with one or more polymeric components. They may be present in an amount of about 0.05% to about 5% of the fluid or slurry composition, and capable of attacking any set retarder present. In an embodiment the oxidizer is encapsulated by the polymeric component. In another aspect, the oxidizer is uniformly mixed with the polymeric, which acts as a binder, the resulting mixture is then pressed into a pellet. In yet another aspect, the resulting pellet is ultimately encapsulated by a polymeric component. The polymeric component used as a binder in forming the pellet may be of a different composition from the polymeric component used in encapsulating the pellet and may be selected from polymer especially resistant to oxidation. Subjecting the fluid or slurry composition to the ionizing radiation can enable the release of the oxidizing agent which reduces the retarding capability of the retarder, allowing set.

In an embodiment the polymeric component selected in the present invention is durable in the high alkaline environment found in cement and exhibits a low tolerance to radiation. In more specific embodiments, the polymeric component exhibits a radiation tolerance of less than about 500 KiloGrays, optionally less than about 250 KiloGrays, optionally less than about 100 KiloGrays. Optionally the polymeric component can have a radiation tolerance of less than about 50 KiloGrays, optionally less than about 10 KiloGrays, optionally less than about 1 KiloGrays, optionally less than about 100 Grays, optionally less than about 50 Grays, optionally less than about 10 Grays, optionally less than about 5 Grays. Alternatively, the polymeric component has a radiation tolerance of from about 4 to about 65 KiloGrays. Optionally the polymeric component can have a radiation tolerance from about 0.1 to about 50 Grays. A non-limiting listing of polymer degradation upon exposure to ionizing radiation is given in Table 2.

TABLE 2

| Polymer | Tolerance (kGy) |
|---|---|
| Teflon | 5 |
| Polyacetals | 15 |
| Propylene-ethylene copolymers | 25-60 |

TABLE 2-continued

| Polymer | Tolerance (kGy) |
| --- | --- |
| Aliphatic Nylons | 50 |
| Polystyrene | 10,000 |
| Phenolics | 50,000 |

In an aspect, the polymeric component is selected from the group consisting of polyisobutylene, fluoroelastomers, silicon rubber, polyesters, polytetrafluoroethylene (PTFE) (available under the trade name TEFLON® from E.I. du Pont de Nemours and Company), polyacetals (available under the trade name DELRIN® from E.I. du Pont de Nemours and Company and under the trade name CELCON® from Ticona), polypropylene, copolymers of polypropylene-ethylene, polymethylpentene, fluorinated ethylene-propylene, perfluoroalkoxy (PFA), polymethylmethacrylate (PMMA) and combinations thereof.

In an embodiment the polymeric component can be selected from the group consisting of: copolymers of methylmethacrylate (MMA) with a α-substituted chloro or cyano acrylates; MMA based polymers with incorporation of fluorine into the methacrylates; polymers having a C—S bond, such as poly(butene-1-sulfone); polymers having a Photosensitive Acid Generator group (PAG) in the polymer structure; polycarbonates such as poly-bisphenyl-A and bisphenyl-C carbonates; polyamides, such as nylon; water-insoluble cellulose-based polymers, such as Colloidon (nitrocellulose), cellulose acetate and cellulose xanthate; and combinations thereof.

Figure 2:
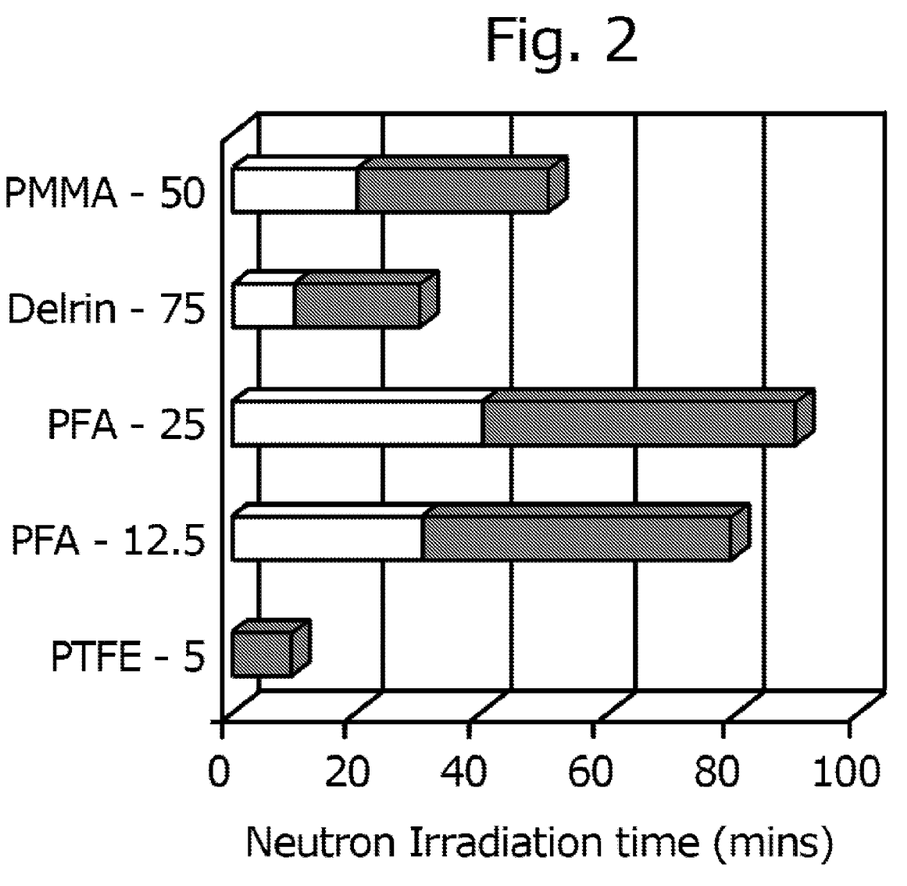
FIG. 2 is a graph of polymer embrittlement due to neutron irradiation for films of various materials and thickness.
Figure 3:
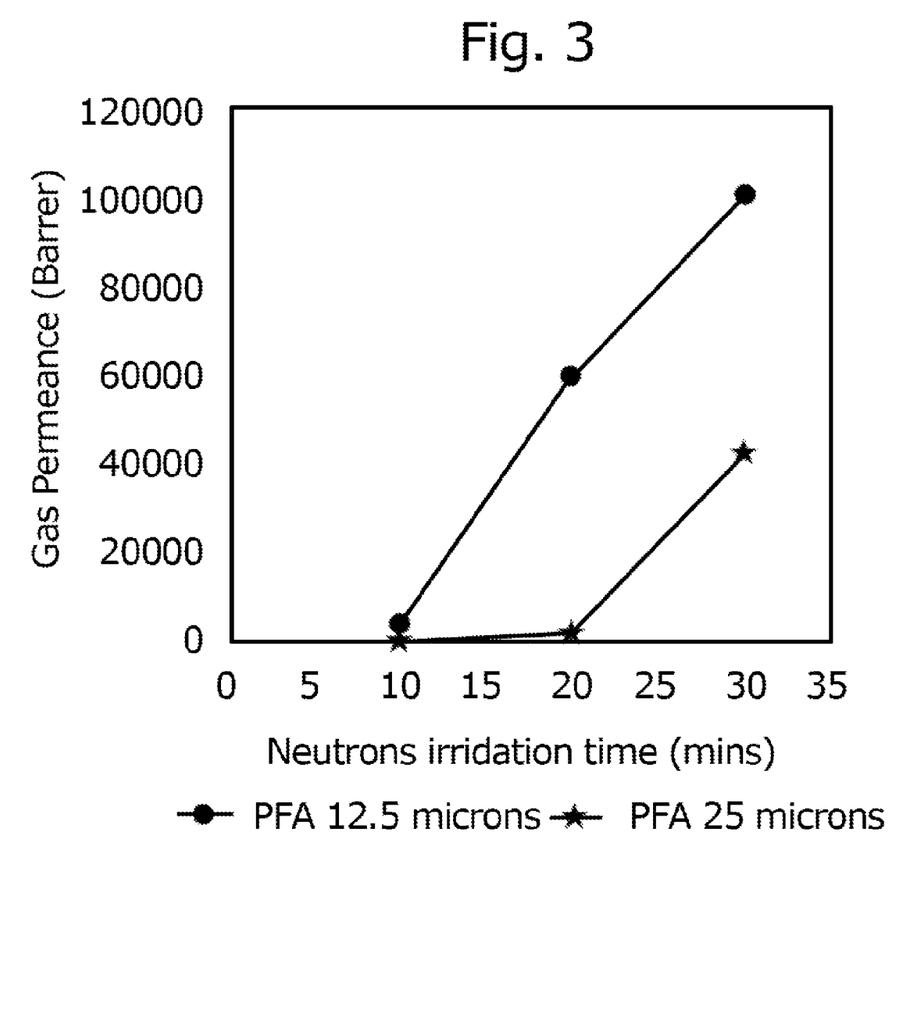
FIG. 3 is a graph of gas permeance for two polymer films of differing thickness upon exposure to neutron irradiation.

Referring to FIGS. 2 and 3, various polymer films were exposed to a neutron flux of $1.2 \times 10^{13}$/s and tested for embrittlement and gas permeability over time. The film material and thickness were PMMA at 50 microns; Delrin at 75 microns; PFA at 25 and 12.5 microns; and PTFE at 5 microns. FIG. 2 illustrates that PMMA with a thickness of 50 microns shows embrittlement effect at about 18 minutes and at about 50 minutes the film had degraded to a degree that it could no longer be tested. It is also seen that some materials such as Delrin are more susceptible to radiation degradation than other materials such as PMMA or PFA. The Delrin film with a thickness of 75 microns degrades before the PFA having a thickness of 12.5 microns.

FIG. 3 illustrates the effect of film thickness on gas permeability and that the PFA film of 25 microns thickness retains gas impermeability for about twice as long as a PFA film of 12.5 microns thickness exposed to the same radiation. FIG. 3 also illustrates that both PFA films observed gas permeability at a time earlier than the embrittlement effect was observed as shown in FIG. 2.

Figure 4:
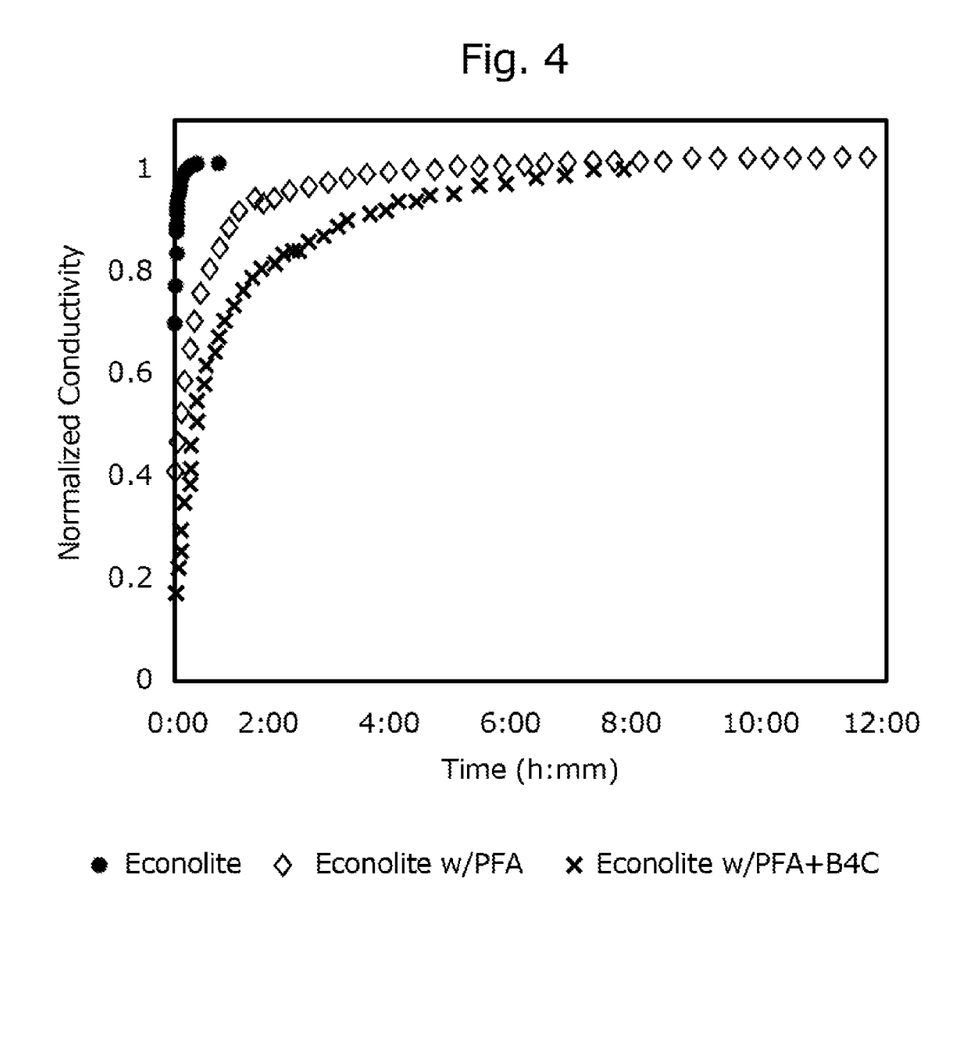
FIG. 4 is a graph of conductivity illustrating the delayed release of an encapsulated material upon exposure to neutron irradiation.

Referring to FIG. 4, a sample of sodium metasilicate, available as Econolite from Halliburton, was coated with a layer of FluoroPel™ PFA and with a layer of FluoroPel™ PFA with $B_4C$. The sample was exposed to a neutron flux of $1.2 \times 10^{13}$/s and tested for conductivity over time. FIG. 4 shows that the coating provided a delayed release profile of the sodium metasilicate that is relative to the radiation exposure. FluoroPel™ is available from Cytonix corporation.

In a further example a sample of Uranine dye on a glass slide was encapsulated using FluoroPel™ PFA with a thickness of approximately 36 microns in a container of fluid. The encapsulated dye was exposed to a neutron flux of $1.2 \times 10^{13}$/s for 50 minutes, during which the Uranine dye had visibly colored the fluid, indicating its dissipation into the fluid.

The polymeric component may also contain an additional material to promote the degradation of the polymer and/or the release of the accelerator into the fluid or slurry. In an embodiment, a promoter for free-radical chain scissioning is added to the polymer capsule and/or the polymeric component used as a binder to accelerate the polymer degradation once triggered by exposure to the ionizing radiation. In a further embodiment, the polymeric component may also contain a sensitizer made from a material having a strong radiation absorption property. The promoter or sensitizer can be any material that increases the capture efficiency of the ionizing radiation within the slurry. In embodiments the promoter or sensitizer material is a boron compound. In embodiments the promoter or sensitizer material has an ionizing radiation tolerance of less than 500 KiloGrays optionally less than about 250 KiloGrays, optionally less than about 100 KiloGrays. Optionally the promoter or sensitizer material can have a radiation tolerance of less than about 50 KiloGrays, optionally less than about 10 KiloGrays, optionally less than about 1 KiloGrays, optionally less than about 100 Grays, optionally less than about 50 Grays, optionally less than about 10 Grays, optionally less than about 5 Grays. Optionally the promoter or sensitizer material can have a radiation tolerance In an alternate embodiment the sealant composition can contain photocatalytic particles such as $TiO_2$, doped $TiO_2$, or composites that can enhance the degradation of the polymers when exposed to ionizing radiation. The photocatalytic particles can be nanoparticles.

Methods of this invention for isolating a portion of a wellbore may include forming a sealant composition including a set modifier, pumping the sealant composition containing the set modifier into a wellbore, and subjecting the sealant composition to ionizing radiation after placement into the wellbore. The set modifier of the invention may be combined with a polymeric component. The polymeric component can serve to prevent the release of the set modifier, such as an accelerator, into the sealant composition. The ionizing radiation introduced is sufficient to dissolve, degrade, or otherwise break down, the polymeric component thus allowing the set modifier to be released into the sealant composition. Once the set modifier is released, it is dispersed into and reacts with the sealant composition, resulting in the initiation of the setting process. The release of the ionizing radiation, which is under the control of technicians in the field, thus acts as a trigger in initiating the setting of the sealant composition.

The polymeric component may be combined with the set modifier by means of encapsulation, binding with the set modifier in a mixture, or both. The polymer coating used in the methods of this invention may be any polymeric component that will degrade upon being subjected to ionizing radiation. In an embodiment, the polymeric component will degrade from exposure to gamma radiation. In another embodiment, the polymeric component will degrade from exposure to gamma radiation in levels of less than about 500 KiloGrays. In an optional embodiment, the amount of ionizing radiation required to degrade a polymeric component is between about 1 Gray to about 500 KiloGray, optionally between about 1 Gray to about 100 KiloGray, optionally between about 20 Gray to about 40 KiloGray. In yet another embodiment, the polymer will degrade from the ionizing radiation emitted from a gamma ray generator that is also used on oil well logging instruments.

The type and level of ionizing radiation used in the methods of this invention may depend upon the polymeric component(s) that are combined with the accelerator. The type and level of the ionizing radiation may be dependent upon what is capable of degrading the polymer component(s). In an embodiment, the type of ionizing radiation includes alpha rays, beta rays, gamma rays, neutron rays, proton rays, UV rays and X-rays, or combinations thereof. In an optional embodiment, the amount of ionizing radiation required to degrade the polymeric component(s) is less than about 500 KiloGrays.

Methods of this invention for isolating a wellbore may include forming a sealant composition including a set modifier, pumping the sealant composition containing the set modifier into a wellbore and subjecting the sealant composition to ionizing radiation after placement into the wellbore. The set modifier of the invention may be a retarder, optionally a sensitized retarder, such as a boronated retarder. The sensitized retarder of the invention is susceptible to certain types of ionizing radiation. The ionizing radiation introduced is sufficient to dissolve, or otherwise break down, the retarder thus allowing the setting of the sealant composition to proceed.

The types and level of the ionizing radiation used in the methods of this invention may depend upon the type of sensitized retarder used. The types and level of the ionizing radiation used may be dependent upon what is capable of altering or destroying the molecules of the sensitized retarder. In an embodiment, the ionizing radiation source is a high-flux neutron source. In more specific embodiment, the high-flux neutron source is selected from the group consisting of plutonium-beryllium, americium-beryllium, and americium-lithium. Optionally, the high flux neutron source is an accelerator based neutron generator. In an embodiment, the type of ionizing radiation includes one or more of: alpha rays, beta rays, gamma rays, neutron rays, proton rays, UV rays, X-rays, or combinations thereof. In an optional embodiment, the amount of ionizing radiation required to alter or destroy the molecules of the sensitized retarder is less than about 500 KiloGrays.

Methods of this invention for isolating a wellbore may include forming a sealant composition that includes both an accelerator or oxidizing agent and a retarder, and exposing the sealant composition to ionizing radiation. The accelerator or oxidizing agent can be released or activated by exposure of the sealant composition to the ionizing radiation, thus able to accelerate the setting of the sealant composition. The retarder can be altered upon exposure of the sealant composition to radiation, thus its ability to retard the setting of the sealant composition can be hindered.

Methods of this invention for cementing a wellbore may include the steps of forming a cement composition including hydraulic cement and a sufficient amount of water to form a slurry, adding to the slurry a desired amount of an accelerator or oxidizing agent, pumping the slurry containing the accelerator or oxidizing agent into a wellbore, and subjecting the slurry to ionizing radiation after placement of the slurry into the wellbore. The accelerator or oxidizing agent of the invention may be combined with a polymeric component. The polymeric component serves to prevent the release of the accelerator or oxidizing agent into the cement slurry. The ionizing radiation introduced is sufficient to dissolve, degrade, or otherwise break down, the polymeric component thus allowing the accelerator or oxidizing agent to be released into the cement slurry. Once the accelerator or oxidizing agent is released, it is dispersed into the cement slurry and reacts with the slurry or the retarder, resulting in the initiation of the setting process. The release of the ionizing radiation, which is under the control of technicians in the field, thus acts as a trigger in initiating the setting of the cement slurry.

The polymeric component may be combined with the accelerator or oxidizing agent by means of encapsulation, binding with the accelerator in a mixture, or both. The polymer coating used in the methods of this invention may be any polymeric component that will degrade upon being subjected to the ionizing radiation. In an embodiment, the polymeric component will degrade from exposure to gamma radiation. In another embodiment, the polymeric component will degrade from exposure to gamma radiation in levels of less than about 500 KiloGrays. In an optional embodiment, the amount of ionizing radiation required to degrade a polymeric component is between about 1 Gray to about 500 KiloGray, optionally between about 1 Gray to about 100 KiloGray, optionally between about 20 Gray to about 40 KiloGray. In yet another embodiment, the polymer will degrade from ionizing radiation emitted from a gamma ray generator that is also used on oil well logging instruments.

The type and level of ionizing radiation used in the methods of this invention may depend upon the polymeric component(s) that are combined with the accelerator or oxidizing agent. The type and level of the ionizing radiation may be dependent upon what is capable of degrading the polymer component(s). In an embodiment, the type of ionizing radiation includes alpha rays, beta rays, gamma rays, X-rays, or combinations thereof. In an optional embodiment, the amount of ionizing radiation required to degrade the polymeric component(s) is between about 1 Gray to about 500 KiloGray, optionally between about 1 Gray to about 100 KiloGray, optionally between about 20 Gray to about 40 KiloGray.

Methods of this invention for cementing a wellbore may include the steps of forming a cement composition including hydraulic cement and a sufficient amount of water to form a slurry, adding to the slurry a desired amount of a retarder, pumping the slurry containing the retarder into a wellbore, and subjecting the slurry to ionizing radiation after placement of the slurry into the wellbore. The retarder of the invention may be a sensitized retarder as disclosed herein, such as a boronated retarder. The sensitized retarder of the invention is susceptible to certain types of irradiation. The ionizing radiation introduced is sufficient to dissolve, or otherwise break down, the retarder thus allowing the setting of the cement slurry to proceed.

The types and level of radiation used in the methods of this invention may depend upon the type of sensitized retarder used. The types and level of ionizing radiation used may be dependent upon what is capable of altering or destroying the molecules of the sensitized retarder. In an embodiment, the ionizing radiation source is a high-flux neutron source. In more specific embodiment, the high-flux neutron source is selected from the group consisting of plutonium-beryllium, americium-beryllium, and americium-lithium. Optionally, the high flux neutron source is an accelerator based neutron generator. In an embodiment, the type of ionizing radiation includes alpha rays, beta rays, gamma rays, X-rays, or combinations thereof. In an optional embodiment, the amount of ionizing radiation required to alter or destroy the molecules of the sensitized retarder is less than about 500 KiloGrays. In embodiments the sensitizer can also be a scintillator material.

Methods of this invention for cementing a wellbore may include the steps of forming a cement composition including hydraulic cement and a sufficient amount of water to form a slurry, adding to the slurry a desired amount of a set retarder, either conventional or sensitized and an accelerator or oxidizing agent, pumping the slurry containing the retarder and the accelerator into a wellbore, and subjecting the slurry to ionizing radiation after placement of the slurry into the wellbore. The accelerator or oxidizing agent of the invention may be combined with a polymeric component. The polymeric component serves to prevent the release of the accelerator or oxidizing agent into the cement slurry. The ionizing radiation introduced is sufficient to dissolve, degrade, or otherwise break down, the polymeric component thus allowing the accelerator to be released into the cement slurry. Once the accelerator or oxidizing agent is released, it can disperse into the cement slurry and react with the slurry or the retarder, resulting in the initiation of the setting process. The sensitized retarder of the invention is susceptible to certain types of irradiation. The ionizing radiation introduced is sufficient to dissolve, or otherwise break down, the retarder thus allowing the setting of the cement slurry to proceed. The release of the ionizing radiation, which is under the control of technicians in the field, thus acts as a trigger in initiating the setting of the cement slurry by releasing the accelerator and sufficiently altering or destroying the retarder.

The type and level of the ionizing radiation delivered to the cementitious slurry may depend on the method used. In methods wherein an accelerator is added and a set retarder is not added, the irradiation should be capable of breaking down the polymeric compound(s) sufficiently to release or otherwise activate the accelerator. In methods wherein an accelerator is not added and a set retarder is added, the ionizing radiation should be capable of altering or destroying the retarder. In some embodiments, wherein an accelerator or oxidizing agent and a set retarder are added to the cement slurry, the ionizing radiation simultaneously breaks down the polymeric compound(s) and destroys the retarder. In other embodiments wherein an accelerator or oxidizing agent and a set retarder are added to the cement slurry, a first ionizing radiation source is capable of destroying the retarder and a second ionizing radiation source is capable of breaking down the polymeric compound(s). The first and second ionizing radiation source may be delivered simultaneously. Alternatively, the ionizing radiation source capable of breaking down the polymeric component can be delivered first, followed by the ionizing radiation source capable of destroying the retarder. Alternatively, the ionizing radiation source capable of destroying the retarder can be delivered first, followed by the ionizing radiation source capable of breaking down the polymeric component.

In an embodiment, the set retarder and/or the accelerator or oxidizing agent are/is added to the cement mixture before water is added to the mixture. In another embodiment, the set retarder and/or the accelerator or oxidizing agent are/is added to the cement mixture after water has been added to the mixture. In yet another embodiment, set retarder is added before the accelerator or oxidizing agent. In yet another embodiment, the accelerator is added before the set retarder. In a further embodiment, the accelerator and/or set retarder is/are added during the mixing of the cement and water.

In an embodiment, once the cementitious composition containing the set retarder and/or accelerating agent or oxidizing agent is obtained, the slurry is then placed in the wellbore, such as in a wellbore/casing annulus. Upon the placement of the slurry containing the set retarder and/or accelerating agent or oxidizing agent in the wellbore, the cement particles and the set retarder and/or accelerating agent or oxidizing agent should be substantially uniformly mixed with the cement particles in the cement slurry.

In a further embodiment, a set retarder as well as both an accelerator and oxidizer are added to the fluid or slurry. Upon being exposed to the ionizing radiation both the accelerator and oxidizer are released. The simultaneous destruction of the retarder by the oxidizer and the acceleration of cement hydration by the accelerator provide rapid set.

According to embodiments of the invention, after the slurry is placed in the wellbore, the ionizing radiation is introduced. Ionizing radiation contains subatomic particles or electromagnetic waves that are energetic enough to detach electrons from atoms or molecules, thereby ionizing them. The occurrence of ionization depends on the energy of the intruding individual particles or waves. An intense flood of particles or waves may not cause ionization if these particles or waves do not carry enough energy to be ionizing. In an embodiment, the amount of the ionizing radiation introduced into the wellbore is determined by the amount of ionizing radiation required to sufficiently alter the polymeric component to enable release of at least a portion of the accelerator or oxidizing agent. In another embodiment, the amount of the ionizing radiation introduced into the wellbore is determined by the amount of ionizing radiation required to sufficiently destroy at least a portion of the retarder. The ionizing radiation can be emitted from charged particles. In an embodiment, the charged particles include alpha particles, beta particles, or gamma particles, or combinations thereof.

In an embodiment, the ionizing radiation is introduced by an ionizing radiation emitter located at a point within the wellbore. In another embodiment, an ionizing radiation emitter located at the surface introduces the ionizing radiation directed downward into the wellbore. In another embodiment, a radiation source is lowered into the wellbore, such as on a wireline, and the ionizing radiation is emitted. The radiation source can be shielded to not emit the ionizing radiation other than when the shielding is removed. For example a radiation source can be shielded at the surface when personnel could otherwise be exposed. Once the ionizing radiation source is placed in the wellbore and radiation can safely be emitted, the shield can be removed or opened, such as by an electronically activated signal transmitted from the surface down the wireline to the shield. In an embodiment the radiation emitter can emit ionizing radiation as it is lowered down the wellbore and as it is pulled up the length of the wellbore. In a further embodiment, two or more ionizing radiation emitters are separately lowered to two or more depths, such that two or more depths of the wellbore may be subject to the ionizing radiation simultaneously.

In an embodiment, the ionizing radiation is introduced under the control of a technician in the field. The technician, engineer, or other on-site employee, can have the control over the emission of the ionizing radiation by imputing a signal that causes a release of the ionizing radiation from an emitter. In this embodiment, the ionizing radiation is released on demand from the technician in the field. The ionizing radiation can be released by a control system having parameters such as timer, flow meter, temperature sensor, or the like. In another embodiment, the lowering and/or emitting of the ionizing radiation source is triggered by a timing mechanism. In a further embodiment, the lowering and/or emitting of the radiation source is triggered by a flow meter that detects the amount of the cement mixture delivered into the wellbore.

As mentioned above, the ionizing radiation of the current invention can be under the control of technicians in the field. The release of the ionizing radiation emissions act as a trigger in the sense that the radiation can destroy the sensitized retarder, thus allowing the setting of the cement slurry to proceed. The release of the ionizing radiation may also act as a trigger when the ionizing radiation emissions act to degrade the polymeric component of the accelerator or oxidizing agent, thus releasing the accelerator or oxidizing agent, or both, into the cement slurry. Once the accelerator or oxidizing agent is released, it is dispersed into the cement slurry and reacts with the slurry or retarder, resulting in the acceleration of the setting process. Therefore, technicians in the field can trigger the thickening of the cement slurry. This triggering process puts the thickening of the cement slurry under the control of technicians in the field and can result in a decrease in the time needed to wait on cement (WOC) in the drilling and completion of a wellbore.

The fluid or slurry compositions used in the present invention can further include a scintillator material. The scintillator material can act to increase capture efficiency of the ionizing radiation and/or can emit radiation upon exposure to the ionizing radiation. A scintillator material having the property of fluorescence can emit radiation, which can be referred to as secondary radiation, as the result of absorption of radiation from another source. For example a scintillator material may emit gamma rays, X-rays, or UV radiation upon exposure to neutrons or gamma rays. This secondary radiation can be used to provide radiation to promote the degradation of the polymer and/or the release of the accelerator into the fluid or slurry. If the secondary radiation includes photons or particles with the same wavelength as that of the absorbed radiation, it can be referred to as resonance radiation.

A variety of neutron scintillators are known, a non-limiting list includes LiF/ZnS:Ag, Li-glass, and LiI:Eu. LiF/ZnS:Ag is shown to produce a very large neutron multiplication factor and has been measured at 160,000 photons per neutron absorbed with the majority of the emission occurring below about 450 nm. Li-glasses typically have an emission maximum below about 400 nm.

A variety of gamma ray scintillators are known, a non-limiting list includes NaI:Tl$^+$, Bi$_4$Ge$_3$O$_{12}$(GSO), Gd$_2$SiO$_5$:Ce$^{3+}$, ZnS:Ag. Alkali halides include CsI and NaI. Typical emission maxima observed for some scintillators are: CsI—about 300 nm; BaF$_2$—about 190 to about 305 nm; CaF$_2$:Eu—about 410 nm; GSO:Ce—about 420 nm; Yttrium Aluminum Perovskite:Ce (Y:Al:CaTiO$_3$:Ce)—about 350 nm.

The scintillator may be used in a powder or crystal form or with a coating such as a polymer. Advantages of incorporating scintillators into the fluid or slurry of the present invention can include the local creation of ionizing secondary radiation that can minimize the impact from the well casing or other environmental influences. Potentially large multiplication factors are possible, for example some scintillators will emit more than 10,000 photons for each absorbed ionizing radiation particle/photon. The photons produced by scintillators can be in the X-ray and UV spectral regions that can be highly absorbed by the polymeric component of the slurry. Since these photons are created locally by the scintillation their emission may increase the efficiency of the polymer encapsulation degradation. More photons above the scission threshold can increase the rate of the polymer degradation that can speed the thickening of the cement slurry and enhance the set-on-command behavior.

The scintillator material may be added to the fluid or slurry. The scintillator material may be incorporated into a polymeric component that forms an encapsulating layer over particles of an accelerator. The scintillator material may be added to a polymeric component that forms a binder for an accelerator that is formed into a pellet and/or a polymeric component that forms an encapsulating layer over the pellet. The scintillator material can also be a sensitizer material.

EXAMPLES

Five polymers were chosen for a comparative test series. The polymers were poly-methyl-methacrylate (PMMA), polyhexylsulfone, cellulose acetate, cellulose acetate butyrate, and polymethylacrylonitrile. The polymers were dissolved in appropriate solvents and thin films were spin-coated onto a glass slide. The thickness of the films ranged from 0.5 µm to 2 µm. The slides were subjected to different treatments as follows: (a) Immersed in saturated Ca(OH)$_2$ solution to test the alkaline stability of the polymer films. This served as the control. (b) Immersed in saturated Ca(OH)$_2$ solution and exposed to neutron radiation. (c) Same as (b) but with TiO$_2$ nanoparticles. (d) Same as (b) but with TiO$_2$ nanoparticles containing Fe$^{3+}$ ions (from Ferric nitrate).

Samples (b) through (d) were exposed to neutron irradiation at a flux of $10^{12}$ n/cm$^2$/sec for 20 minutes. The results are tabulated in Table 3.

TABLE 3

| Polymer | Treatment | Appearance |
|---|---|---|
| PMMA | Control | Intact |
|  | Irradiated | Intact |
|  | Irradiated with TiO$_2$ | Intact |
|  | Irradiated with TiO$_2$ + Fe$^{3+}$ | Intact |
| Polyhexylsulfone | Control | Cloudy |
|  | Irradiated | Partial Degradation |
|  | Irradiated with TiO$_2$ | Partial Degradation |
|  | Irradiated with TiO$_2$ + Fe$^{3+}$ | Partial Degradation |
| Cellulose Acetate | Control | Intact |
|  | Irradiated | Intact |
|  | Irradiated with TiO$_2$ | Total Degradation |
|  | Irradiated with TiO$_2$ + Fe$^{3+}$ | Breaks apart under N2 stream during drying |
| Cellulose Acetate Butyrate | Control | Intact |
|  | Irradiated | Intact |
|  | Irradiated with TiO$_2$ | Film has shrunk |
|  | Irradiated with TiO$_2$ + Fe$^{3+}$ | Partial Degradation |
| Polymethyl-acrylonitrile | Control | Intact |
|  | Irradiated | Partial Degradation |
|  | Irradiated with TiO$_2$ | Partial Degradation |
|  | Irradiated with TiO$_2$ + Fe$^{3+}$ | Partial Degradation |

The term "cementitious composition" as may be used herein includes pastes (or slurries), mortars, and grouts, such as oil well cementing grouts, shotcrete, and concrete compositions including a hydraulic cement binder. The terms "paste", "mortar" and "concrete" are terms of art: pastes are mixtures composed of a hydratable (or hydraulic) cement binder (usually, but not exclusively, Portland cement, Masonry cement, Mortar cement, and/or gypsum, and may also include limestone, hydrated lime, fly ash, granulated blast furnace slag, and silica fume or other materials commonly included in such cements) and water; "mortars" are pastes additionally including fine aggregate (e.g., sand), and "concretes" are mortars additionally including coarse aggregate (e.g., crushed rock or gravel). The cement compositions described in this invention are formed by mixing required amounts of certain materials, e.g., a hydraulic cement, water, and fine and/or coarse aggregate, as may be required for making a particular cementitious composition.

The term "accelerator" can include any component, which reduces the setting time of a cement composition. For example, the accelerator may include alkali and alkali earth metal salts, such as a calcium salt. The calcium salt may include calcium formate, calcium nitrate, calcium nitrite or calcium chloride.

The term "encapsulating layer" as used herein can mean any form of coating or binding wherein most of the material being encapsulated is enclosed within the layer and that the dissipation of the material is substantially restricted by the layer. It does not mean that all of the material being encapsulated is enclosed within the layer or that the material being encapsulated cannot leak through the encapsulating layer.

The term oxidizer can include any component which is capable of degrading the retarder present. These include, but are not limited to alkaline earth and zinc salts of peroxide, perphosphate, perborate, percarbonate; calcium peroxide, calcium perphosphate, calcium perborate, magnesium peroxide, magnesium perphosphate, zinc perphosphate; calcium hypochlorite, magnesium hypochlorite, chloramine T, trichloroisocyanuric acid, trichloromelamine, dichloroisocynaurate dihydrate, anhydrous dichloroisocynaurate; and mixtures thereof.

The term "radiation tolerance" as used herein is the amount of ionizing radiation that a material can withstand without noticeable or measurable degradation.

The term "retarder" or "set retarder" can include boronated or non-boronated forms of phosphonic acid, phosphonic acid derivatives, lignosulfonates, salts, sugars, carbohydrate compounds, organic acids, carboxymethylated hydroxyethylated celluloses, synthetic co- or ter-polymers including sulfonate and carboxylic acid groups, and/or borate compounds.

The terms "ionizing radiation" or "radiation" can be referred to as ionization inducing or indirectly ionizing, that are able to detach electrons from atoms or molecules, and can include alpha rays, beta rays, gamma rays, neutron radiation, proton rays, UV and X-rays.

The term "set" as used herein refers to an increase in mechanical strength of a fluid or slurry sufficient to perform a desired result, such as to restrict movement of an item or impede fluid flow or pressure transfer through a fluid. A cement may be referred to as set when it can restrict the movement of a pipe, or impede fluid flow or pressure transfer, regardless of whether the cement has cured to a fully solid composition. A fluid or slurry can be referred to as set when it has thickened to a sufficient level that it achieves the desired result, such as the isolation of a particular zone or the restriction of fluid flow or pressure transfer, regardless of whether it has reached its final consistency.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Other and further embodiments, versions and examples of the invention may be devised without departing from the basic scope thereof and the scope thereof is determined by the claims that follow.

While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee.

The invention claimed is:

1. A method of isolating a portion of a wellbore comprising:
    placing a sealant composition into a subterranean formation after drilling of the wellbore therein; and
    subjecting the sealant composition to ionizing radiation;
    wherein the sealant composition comprises a set modifier and a polymeric component, and
    wherein the ionizing radiation causes degradation of the polymeric component and release of the set modifier.

2. The method of claim 1, wherein subjecting the sealant composition to the ionizing radiation enables the set modifier to react resulting in an increase in the mechanical strength of the sealant composition.

3. The method of claim 1, wherein the set modifier is selected from the group consisting of an accelerator, an oxidizing agent, and combinations thereof.

4. The method of claim 1, wherein the sealant composition is selected from the group consisting of a resin, a cement, a settable mud, a lost circulation fluid, a conformance fluid, and combinations thereof.

5. The method of claim 1, wherein the polymeric component forms an encapsulating layer over particles of the set modifier.

6. The method of claim 1, wherein the polymeric component is mixed with the set modifier, and wherein the polymeric component acts as a binder and the resulting mixture is formed into a pellet.

7. The method of claim 6, wherein the polymeric component forms an encapsulating layer over the pellet.

8. The method of claim 6, wherein a first polymeric component acts as the binder that is subject to alkaline hydrolysis and a second polymeric component forms an encapsulating layer over the pellet that is resistant to alkaline hydrolysis.

9. The method of claim 1, wherein the polymeric component has a radiation tolerance of less than about 100 KiloGrays.

10. The method of claim 1, wherein the polymeric component comprises one or more component selected from the group consisting of copolymers of methyl-methacrylate (MMA) with a α-substituted chloro or cyano acrylates, MMA based polymers with incorporation of fluorine into the methacrylates, polymers having a C—S bond, polymers having a Photosensitive Acid Generator group (PAG) in the polymer structure, polycarbonates; polyamides, water-insoluble cellulose-based polymers, and combinations thereof.

11. The method of claim 1, wherein the set modifier comprises an accelerator added in an amount of from about 0.1% to about 20% by weight of the sealant composition.

12. The method of claim 1, wherein the set modifier comprises an oxidizing agent added in an amount of about 0.05% to about 5% by weight of the sealant composition.

13. The method of claim 1, wherein subjecting the sealant composition to the ionizing radiation enables an oxidizing agent to degrade a retarder and reduce its retarding effect.

14. The method of claim 1, wherein the sealant composition further comprises photocatalytic particles capable of enhancing degradation of the polymeric component upon exposure to the ionizing radiation.

15. The method of claim 14, wherein the photocatalytic particles are selected from the group consisting of $TiO_2$, doped $TiO_2$, and combinations thereof.

16. The method of claim 1, wherein the ionizing radiation is selected from the group consisting of alpha rays, beta rays, gamma rays, neutron rays, proton rays, UV rays, X-rays, and combinations thereof.

17. The method of claim 1, wherein the ionizing radiation is emitted from a high-flux neutron source.

18. The method of claim 17, wherein the high-flux neutron source is selected from the group consisting of plutonium-beryllium, americium-beryllium, americium-lithium, and combinations thereof.

19. The method of claim 17, wherein the high flux neutron source is an accelerator based neutron generator.

20. A method of cementing a wellbore comprising:
preparing a cement composition comprising:
   hydraulic cement,
   sufficient water to form a slurry,
   an accelerator, and
   a polymeric component;
wherein the polymeric component inhibits release of the accelerator;
placing the cement composition into the wellbore; and
subjecting the cement composition to ionizing radiation to degrade the polymeric component and release the accelerator.

21. The method of claim 20, wherein the polymeric component is a binder, an encapsulating layer, or a combination thereof, that inhibits release of the accelerator.

* * * * *